United States Patent
Bai et al.

(10) Patent No.: US 11,610,129 B2
(45) Date of Patent: Mar. 21, 2023

(54) SYSTEM AND METHOD FOR MULTISCALE DEEP EQUILIBRIUM MODELS

(71) Applicant: Robert Bosch GmbH, Stuttgart (DE)

(72) Inventors: Shaojie Bai, Pittsburgh, PA (US); Jeremy Kolter, Pittsburgh, PA (US); Vladlen Koltun, Santa Clara, CA (US); Devin T. Willmott, Pittsburgh, PA (US)

(73) Assignee: ROBERT BOSCH GMBH

( * ) Notice: Subject to any disclaimer, the term of this patent is extended or adjusted under 35 U.S.C. 154(b) by 243 days.

(21) Appl. No.: 16/895,683

(22) Filed: Jun. 8, 2020

(65) Prior Publication Data

US 2021/0383234 A1  Dec. 9, 2021

(51) Int. Cl.
  *G06N 3/08*   (2006.01)
  *G06N 3/084*  (2023.01)
  *G06N 5/046*  (2023.01)
  *G06T 3/40*   (2006.01)
  *G06K 9/62*   (2022.01)

(52) U.S. Cl.
  CPC .......... *G06N 3/084* (2013.01); *G06K 9/6268* (2013.01); *G06K 9/6289* (2013.01); *G06N 5/046* (2013.01); *G06T 3/4007* (2013.01)

(58) Field of Classification Search
  CPC .......... G06N 3/084; G06N 3/08; G06N 5/04; G06N 5/046; G06K 9/6268; G06K 9/62; G06K 9/6289; G06T 3/4007; G06T 3/40
  See application file for complete search history.

(56) References Cited

U.S. PATENT DOCUMENTS

| | | | |
|---|---|---|---|
| 2020/0161005 A1* | 5/2020 | Lyman | G16H 40/20 |
| 2020/0302265 A1* | 9/2020 | Wang | G06N 3/04 |
| 2021/0326663 A1* | 10/2021 | Winston | G06V 20/10 |

OTHER PUBLICATIONS

Bai et al., "Trellis Networks For Sequence Modeling", Published as a conference paper at ICLR 2019, 18 pages.
Bai et al., "Deep Equilibrium Models", 33rd Conference on Neural Information Processing Systems (NeurIPS 2019), Vancouver, Canada, 12 pages.
Chen et al., "Neural Ordinary Differential Equations", 32nd Conference on Neural Information Processing Systems NeurIPS 2018), Montréal, Canada, 13 pages.
Chen et al., "Training Deep Nets with Sublinear Memory Cost", arXiv:1604.06174v2 [cs.LG] Apr. 22, 2016, 12 pages.

* cited by examiner

*Primary Examiner* — Tuan H Nguyen
(74) *Attorney, Agent, or Firm* — Dickinson Wright PLLC

(57) ABSTRACT

A computer-implemented method for a classification and training a neural network includes receiving input at the neural network, wherein the input includes a plurality of resolution inputs of varying resolutions, outputting a plurality of feature tensors for each corresponding resolution of the plurality of resolution inputs, fusing the plurality of feature tensors utilizing upsampling or down sampling for the vary resolutions, utilizing an equilibrium solver to identify one or more prediction vectors from the plurality of feature tensors, and outputting a loss in response to the one or more prediction vectors.

20 Claims, 8 Drawing Sheets

SYSTEM AND METHOD FOR MULTISCALE DEEP EQUILIBRIUM MODELS

TECHNICAL FIELD

The present disclosure relates to computer systems that have capability for artificial intelligence, including neural networks.

BACKGROUND

A DEQ (Deep Equilibrium) model may define some forward function $f$ such that the forward pass of the network is given by first solving for an equilibrium point $z^*=f(z^*, x; \theta)$. The backward pass may correspond largely to multiplying by the Jacobian $$\frac{\partial z^*}{\partial \theta},$$

which in its exact form requires the solution of a linear systems. There are three primary challenges in developing a DEQ model. One may be defining $f$ such that the fixed point $z^*$ exists and ideally is unique. The second may be defining a root-finding procedure that can find the fixed point $z^*$ in the forward pass. The third may be defining a back pass to solve the multiplication by the Jacobian $$\frac{\partial z^*}{\partial \theta}.$$

Past deep learning methods for computer vision tasks satisfy the first property by having layers that combine features at certain resolutions and gradually down sample the image, but these layers are explicitly defined, so that memory requirements increase with number of layers. On the other hand, DEQ models can simulate larger networks with a small memory footprint, but does not learn in a hierarchical fashion. The DEQ models may maintain the same resolution throughout the forward & backward pass, and do not explicitly define multiple layers, so the DEQ models may have difficulty to down sample at intermediate points in the network.

SUMMARY

According to one embodiment, a computer-implemented method for a classification and training a neural network includes receiving input at the neural network, wherein the input includes a plurality of resolution inputs of varying resolutions, outputting a plurality of feature tensors for each corresponding resolution of the plurality of resolution inputs, fusing the plurality of feature tensors utilizing upsampling or down sampling for the vary resolutions, utilizing an equilibrium solver to identify one or more prediction vectors from the plurality of feature tensors, and outputting a loss in response to the one or more prediction vectors.

According to a second embodiment, a computer-implemented method for a classification of input to a neural network includes receiving input at the neural network, wherein the input includes a plurality of resolution inputs, identifying feature tensors for each corresponding resolution of the plurality of resolution inputs, inputting the feature tensors for each corresponding resolution to a corresponding residual block, and utilizing an equilibrium solver to identify one or more prediction vectors from the plurality of feature tensors to output a classification of the input.

According to a third embodiment, a system for training a neural network include an input interface for accessing input data for the neural network and a processor in communication with the input interface. The processor programmed to receive the input data at the neural network, wherein the input includes a plurality of resolution inputs of varying resolutions, outputting a plurality of feature tensors for each corresponding resolution of the plurality of resolution inputs, fusing the plurality of feature tensors utilizing upsampling or down sampling for the vary resolutions, utilizing an equilibrium solver to identify a prediction vector in response to the plurality of feature tensors, wherein the prediction vector includes features associated with each of the plurality of feature tensors, and outputting the prediction vector as a classification of the input data.

DETAILED DESCRIPTION

Figure 1:
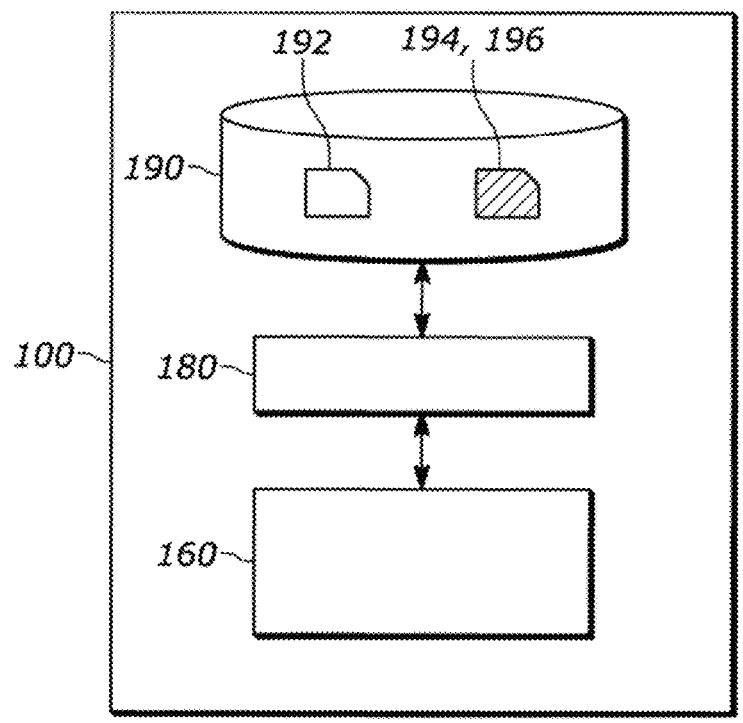
FIG. 1 shows a system 100 for training a neural network.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In the previous DEQ models, defining a function with a fixed point may be done heuristically by using network structures that empirically seem to produce stable fixed points. This may include using existing transformer-style architectures, or existing convolutional architectures, with appropriate layer normalization to attempt to provide a stable system. However, such layers come with no formal guarantees for the existence of a fixed point. For root finding procedure, the DEQ may use a nonlinear Broyden method, which is also not guaranteed to find a root (even if a root or fixed point exists). Additionally, the backward pass may use a similar Broyden method for a linear solve, which may be guaranteed to multiply by the appropriate inverse if it exists, but the Jacobian will not correspond to a meaningful derivative if the fixed point does not exist or if the forward pass fails to converge.

A deep neural network with hidden layers z and activations $f$ such that $z^{[i+1]}=f(z^{[i]}, \theta_i, c(x))$ for $i=0, 1, 2, \ldots, L$ with weights $\theta_i$ and previous layer inputs $c(x)$ are both tied across layers, e.g., $\theta_i=\theta \forall i$. Some of these activations $f$ may exhibit an attractor property, e.g., there exists a fixed point $z^*$ such that $$\lim_{L \to \infty} \underbrace{(f \circ \ldots \circ f)}_{L-\text{times}}(z^{[0]}, \theta, c(x)) = z^*,$$

i.e., the repeated application of $f$ until an initial activation $z^{[0]}$ converges to a fixed point $z^*$. If this is the case, the iterated function application may be equivalently replaced by a numerical method to find the fixed-point directly. This shifts the problem from computing the forward and backward passes for multiple layers to computing and optimizing the fixed point directly via numerical methods. This may reduce the memory footprint (as no intermediate values in the layers need be stored) and solves the problem of finding an optimal number of layers L.

The multiscale deep equilibrium model (MDEQ) builds on its predecessor the deep equilibrium model (DEQ). While input to the DEQ is of a single resolution, input to the MDEQ is supplied at multiple resolutions, which allows it to learn from a spectrum of resolutions ranging from the fine-grained features (high resolution) to the global features (low resolution). The MDEQ also specifies a process to mix and combine information among different scales. Also, output from the DEQ is the same resolution as its input, while the MDEQ gives an output for each of the input scales. This makes the MDEQ model more flexible with respect to joint learning or transfer as output at different resolutions may be used to learn auxiliary losses on a single training task, to learn several tasks simultaneously (i.e. use high-resolution outputs for semantic segmentation, and low-resolution outputs for image classification), or to more easily transfer a learned model from one task to another.

The MDEQ model learns in a hierarchical fashion, e.g., one that considers the data at multiple scales or resolutions, which is essential to learning in multiple tasks (e.g. computer vision tasks). The MDEQ models implicitly, which can simulate much larger networks while maintain a relatively small memory footprint of storing and training the model.

FIG. 1 shows a system 100 for training a neural network. The system 100 may comprise an input interface for accessing training data 192 for the neural network. For example, as illustrated in FIG. 1, the input interface may be constituted by a data storage interface 180 which may access the training data 192 from a data storage 190. For example, the data storage interface 180 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 190 may be an internal data storage of the system 100, such as a hard drive or SSD, but also an external data storage, e.g., a network-accessible data storage.

In some embodiments, the data storage 190 may further comprise a data representation 194 of an untrained version of the neural network which may be accessed by the system 100 from the data storage 190. It will be appreciated, however, that the training data 192 and the data representation 194 of the untrained neural network may also each be accessed from a different data storage, e.g., via a different subsystem of the data storage interface 180. Each subsystem may be of a type as is described above for the data storage interface 180. In other embodiments, the data representation 194 of the untrained neural network may be internally generated by the system 100 on the basis of design parameters for the neural network, and therefore may not explicitly be stored on the data storage 190. The system 100 may further comprise a processor subsystem 160 which may be configured to, during operation of the system 100, provide an iterative function as a substitute for a stack of layers of the neural network to be trained. Here, respective layers of the stack of layers being substituted may have mutually shared weights and may receive, as input, an output of a previous layer, or for a first layer of the stack of layers, an initial activation, and a part of the input of the stack of layers. The processor subsystem 160 may be further configured to iteratively train the neural network using the training data 192. Here, an iteration of the training by the processor subsystem 160 may comprise a forward propagation part and a backward propagation part. The processor subsystem 160 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 196 of the trained neural network, this data may also be referred to as trained model data 196. For example, as also illustrated in FIG. 1, the output interface may be constituted by the data storage interface 180, with said interface being in these embodiments an input/output ("TO") interface, via which the trained model data 196 may be stored in the data storage 190. For example, the data representation 194 defining the 'untrained' neural network may during or after the training be replaced, at least in part by the data representation 196 of the trained neural network, in that the parameters of the neural network, such as weights, hyperparameters and other types of parameters of neural networks, may be adapted to reflect the training on the training data 192. This is also illustrated in FIG. 1 by the reference numerals 194, 196 referring to the same data record on the data storage 190. In other embodiments, the data representation 196 may be stored separately from the data representation 194 defining the 'untrained' neural network. In some embodiments, the output interface may be separate from the data storage interface 180, but may in general be of a type as described above for the data storage interface 180.

Figure 2:
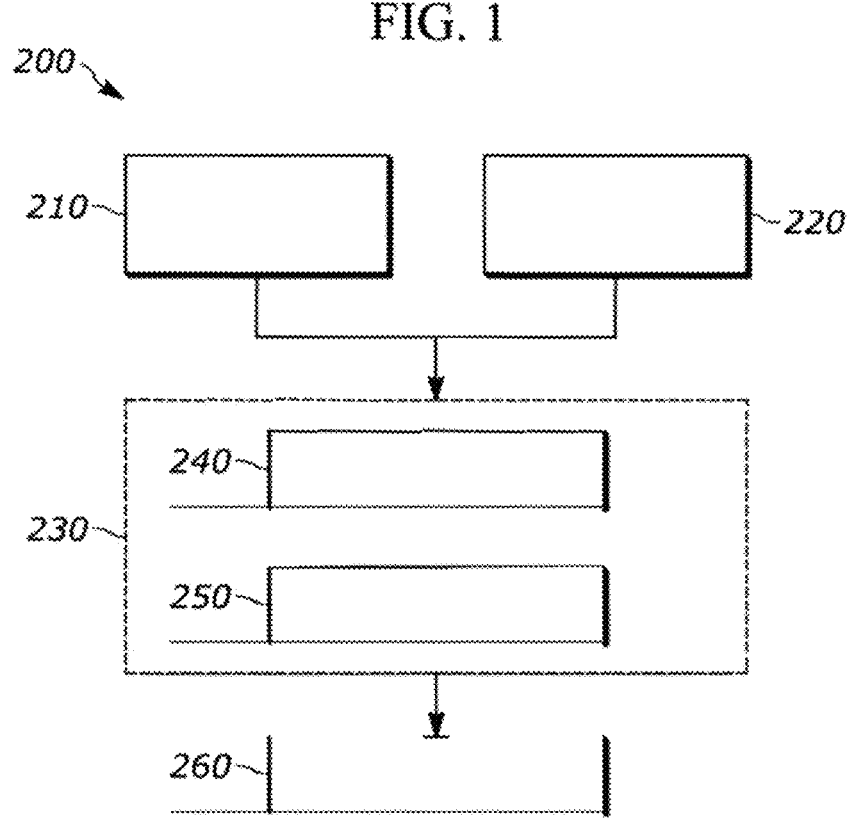
FIG. 2 shows a computer-implemented method 200 for training a neural network.

FIG. 2 shows a computer-implemented method 200 for training a neural network. The method 200 may correspond to an operation of the system 100 of FIG. 1, but does not need to, in that it may also correspond to an operation of another type of system, apparatus or device or in that it may correspond to a computer program.

The method 200 is shown to comprise, in a step titled "PROVIDING DATA REPRESENTATION OF NEURAL NETWORK", providing 210 a neural network, wherein the providing of the neural network comprises providing an iterative function as a substitute for a stack of layers of the neural network, wherein respective layers of the stack of layers being substituted have mutually shared weights and receive as input an output of a previous layer, or for a first layer of the stack of layers, an initial activation, and a part of the input of the stack of layers. The method 200 is further shown to comprise, in a step titled "ACCESSING TRAINING DATA", accessing 220 training data for the neural network. The method 200 is further shown to comprise, in a step titled "ITERATIVELY TRAINING NEURAL NETWORK USING TRAINING DATA", iteratively training 230 the neural network using the training data, which training 230 may comprise a forward propagation part and a backward propagation part. Performing the forward propagation part by the method 200 may comprise, in a step titled "DETERMINING EQUILIBRIUM POINT USING ROOT-FINDING ALGORITHM", determining 240 an equilibrium point of the iterative function at which the iterative function converges to a fixed point, wherein determining the equilibrium point comprises using a numerical root-finding algorithm to find a root solution for the iterative function minus its input, and in a step titled "PROVIDING EQUILIBRIUM POINT AS SUBSTITUTE FOR OUTPUT OF STACK OF LAYERS", providing 250 the equilibrium point as a substitute for an output of the stack of layers in the neural network. The method 200 may further comprise, after the training and in a step titled "OUTPUTTING TRAINED NEURAL NETWORK", outputting 260 a trained neural network. The Deep Equilibrium (DEQ) neural network may be further described in the Patent Application titled "DEEP NEURAL NETWORK WITH EQUILIBRIUM SOLVER," having application Ser. No. 16/985,582, filed Aug. 5, 2020, which is herein incorporated by reference in its entirety.

Figure 3:
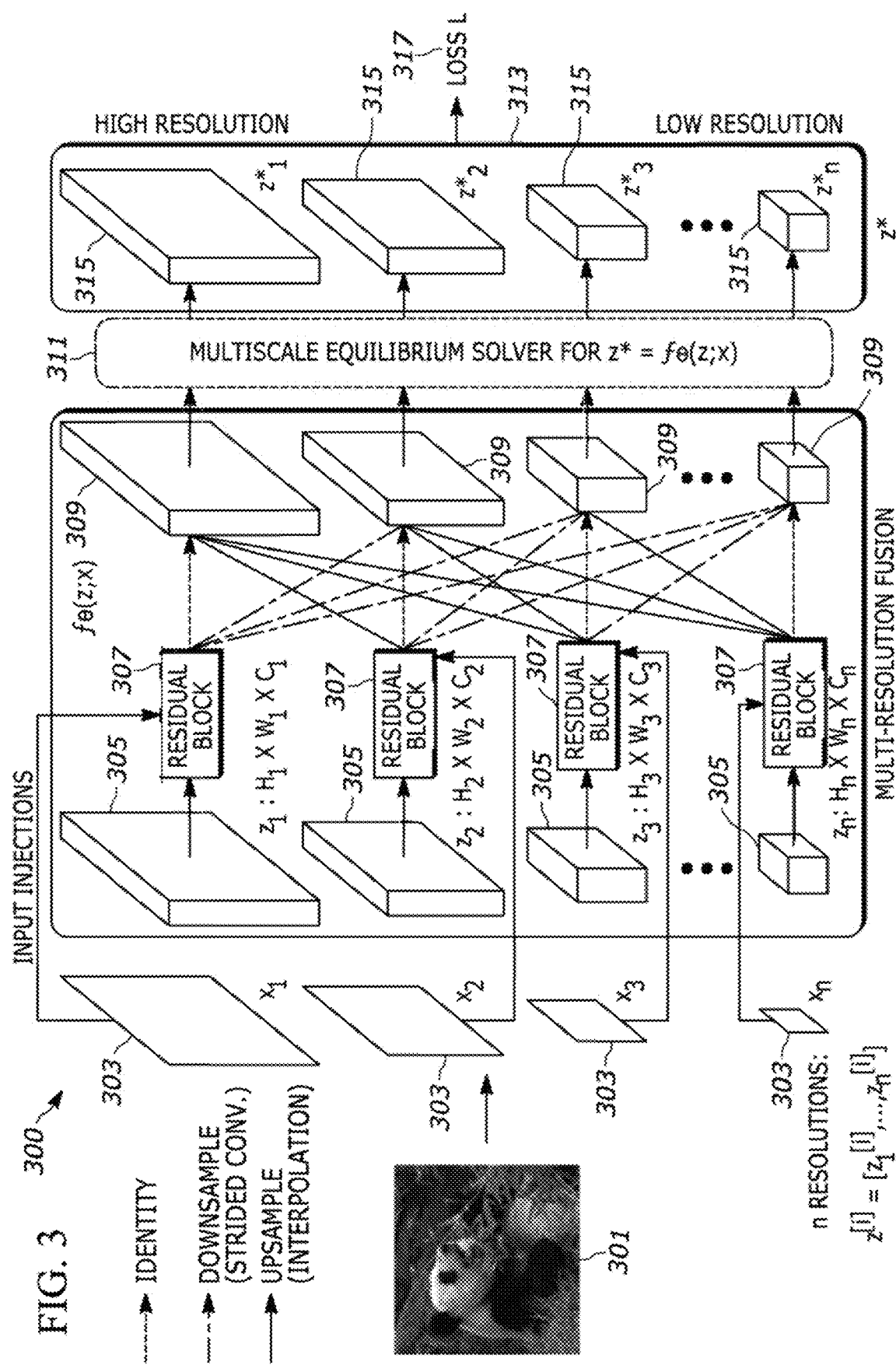
FIG. 3 illustrates the general structure of a MDEQ model.

FIG. 3 illustrates the general structure of a MDEQ model 300. As in the previous DEQ model, $f_\theta$ may denote the transformation of the fixed point of which the system is interested in, and x may be the precomputed input representation provided to $f_\theta$ and z for the model's internal state.

For context, in the original DEQ model, the DEQ in the forward pass (inference) sequence may include an input $\theta \in R^n$ and $c \in R^k$. The hyperparameters may include a base layer function $f: R^m \times R^n \times R^k \rightarrow R^m$. The algorithm may:
1. Initialize memory $z^{[0]}$.
2. Define function $g: z \mapsto f(z, \theta, c) - z$.
3. Call subroutine $z^* = \text{RootFind}(\lambda z \mapsto g(z), z^{[0]})$.

The DEQ model may output $z^* \in R^m$. Concretely, Root-Find can be computed via by any root finder method. In a non limiting way, this may include any Newton's method variant, e.g, classic Newton-Raphson method, Broyden's method, Steffensen's method, etc.

During the DEQ Backward Pass Training Sequence, the system may utilize as inputs the backpropagated error $\delta_z \in R^m$ as well as $z^* \in R^m$, $c \in R^k$ from the forward pass. The algorithm for the backward pass may run the following steps:

1. Define function $g: z \mapsto f(z, \theta, c(x)) - z$

2. Compute partial derivatives $\dfrac{df(z^*, \theta, c(x))}{d\theta}$ and $\dfrac{df(z^*, \theta, c)}{dc}$.

3. A)Compute $\delta_\theta = -\delta_z (J_g |_{z^*})^{-1} \dfrac{df(z^*, \theta, c(x))}{d\theta}$ and $\delta_c = -\delta_z (J_g |_{z^*})^{-1} \dfrac{df(z^*, \theta, c(x))}{dc}$.

Or

B)Solve linear system $(J_g |_{z^*})^T x = -\delta_z^T$ via suitable subroutine.

The MDEQ model, which is further described below, builds on the following forward pass sequence and backward pass sequence by specifying the function $f_\theta(x, z)$ used in the above algorithms. The hyperparameters in the MDEQ model may include n, the number of resolutions. The inputs (e.g., input) may include $x=[x_1, \ldots, x_n]$ (input at each scale, with resolutions ordered decreasingly) and $z=[z_1, \ldots, z_n]$ (hidden state, $z_i$ is of same size as $x_n$). The Algorithm may, for each resolution $i=1, \ldots, n$:

$\widetilde{z}_i = \text{Norm}(\text{Conv2}d(z_i))$ $\hat{z} = \text{Norm}(\text{Conv2}d(\text{ReLU}(\widetilde{z}_i))) + x_i$ $z_i^+ = \text{Norm}(\text{ReLU}(\widehat{z}_i + z_i))$ Norm may be defined as a group normalization operation (similar to batch normalization).

Then for each resolution $i=1, \ldots, n$, the MDEQ model may apply a multi-resolution fusion step that mixes features from other scales:

$z_i^{++} \leftarrow z_i^+ + E_{j<i}\text{StridedConv2}d(z_j^+) + \Sigma_{j>i}\text{Interpolate}$
$(1\text{by}1\text{Conv2}d(z_j^+))$ where one or more 2-strided 3×3 convolution(s) (e.g., StridedConv2d is one or more) is are applied to higher resolutions, and a 1×1 convolution followed by bilinear interpolation is applied to lower resolutions.

The output off is the set of hidden states $z^{++}=[z_1^{++}, \ldots, z_n^{++}]$. However, these steps may be modified, as long as the first step is a transformation applied separately to each resolution that retains their shape, and the second is a transformation that mixes information among different resolutions.

This function $f_\theta(x, z)$ may then be used in the forward and backward passes above. After the forward pass, the model may obtain the root $z^*$ of $f_\theta(x, z)$, which in the MDEQ case is a set $[z^*_1, \ldots, z^*_n]$ of resolutions, any of which may be utilized for prediction or training, depending on their relevance to the learning task at hand.

One of the main concepts of the MDEQ is the transformation of $f_\theta$ that is driven to equilibrium. The system may use such a design in which features at different resolutions 303 are first taken through residual blocks 307. The features may be derived from an input image 301 that has varying resolutions 303 or resolution image 303, as shown in FIG. 3.

Each resolution 303 may have its own corresponding residual block 307. The residual blocks 307 may be shallow and be identical in structure. The different resolution streams may be processed side by side or simultaneously. At resolution i, the residual block may receive the internal state $z_i$ along with an input representation $x_i$, and outputs a transformed feature tensor 305 $z_i^+$ at the same resolution.

The input 301 may go through a series of transformations to form x 303, which will be provided to $f_\theta$. In contrast to the original DEQ model that acts on a sequence and is provided with a single representation of the input, the MDEQ may be provided with input representations at n resolutions (e.g., n=4). The transformation at each resolution receives its own input representation, $x_i \in R^{HiXWiXCi}$ for i=1, . . . , n. Lower-resolution input representations may be derived from the original (high-resolution) input via 2-strided convolutions.

While the original DEQ has an internal state with a single tensor z, the MDEQ state includes a collection of tensors 305 at n resolutions:

$z=[z_1, \ldots, z_n]$ (hidden state, $z_i$ is of same size as $x_n$)

Each of the different tensors 305 have different dimensions and different resolutions. As such, the equilibrium solver 311 may be based on the previous approach of other DEQ models. The system may initialize the internal states by setting $z_i^{[0]}=0$ for all scales i. Because the system is performing root-finding, the system does not need to vectorize the multi-resolution tensors. The collection of tensors $z=[z_1, \ldots, z_n]$ may be maintained as a collection of n tensors whose respective equilibrium states may be solved for and backpropagates through simultaneously, with each resolution inducing its own gradient.

The solver 311 may also be modified in comparison to the previous DEQ model. The high dimensionality of images can make storing such updates extremely expensive, their low rank notwithstanding. To address this, the system improves memory efficiency of the forward and backward passes. The new solver may keep the latest m low-rank updates at any step and discards the earlier ones. The solver 311 may output a single prediction vector 313 for all resolutions. The prediction vector 313 may include features of each of the vectors for the corresponding resolution.

Prior implicit models assume that a loss 317 is defined on a single stream of implicit hidden states that have a uniform input and output shape, thus, it is not clear how such a model can be transferred across structurally different tasks (e.g., pretraining on image classification and fine-tuning on semantic segmentation). Furthermore, there is no natural way to define auxiliary losses because the are no "layers" and the forward and backward computation trajectory are decoupled. The loss 317 in the MDEQ model may be associated with each of the prediction vectors, since the MDEQ model may assign a loss to more than one of the vectors. As such, the vectors may always have a loss associated with at least one of them.

The MDEQ model may expose convenient "interfaces" to its states at multiple resolutions. One resolution (the highest) can be the same as the resolution of the input, and can be used to define losses for dense prediction tasks, such as semantic segmentation. For example, this may include deriving specific classification of associated parts of the objects identified in the image, such as facial recognition, eye recognition, hair color, etc. Another resolution (e.g., the lowest) can be a vector in which the spatial dimensions are collapsed, and can be used to define losses for image-level labeling tasks, such as image classification. This may suggest clean protocols for training the same model for different tasks, either jointly (e.g., multi-task learning in which structurally different supervision flows through multiple heads) or in sequence (e.g., pretraining for image classification through one head and fine-tuning for semantic segmentation through another.)

Because batch normalization may not be directly suitable for implicit models because it estimates population statics based on layers, which are implicit in the MDEQ setting, and the Jacobian matrix of the transformation $f_\theta$ may scale badly to make the fixed point significantly harder to solve for. Thus, the MDEQ may utilize group normalization, which groups the input channels and performs normalization within each group (e.g., each resolution). The Group normalization may be independent of batch size and offers a more natural support for transfer learning (e.g., pretraining and fine-tuning on structurally different task). The MDEQ may not utilize the learnable affine parameters of Group Normalization for stability.

Rather than utilize the conventional spatial dropout used by explication vision models that are applied to a random mask to given layers in the network, the MDEQ may adopt a variational dropout technique found in RNNs (Recurrent Neural Networks) where the exact same mask may be applied at all invocations of $f_\theta$ and is reset at the start of every training iteration.

The multiscale features may be initialized to $z_i^{[0]}=0$ for all resolutions i. However, this may cause certain instabilities when training MDEQ, especially during the starting phase of it, which may be due to the drastic change of slope of ReLU non-linearity at the original, where derivative is undefined. To combat this, the MDEQ model may replace the last ReLU in both the residual block and the multiscale fusion by a softplus in the initial phase of training. These may be later switched back to ReLU. The softplus provides a smooth approximation to the ReLU, but has a slope $$1 - \frac{1}{1 + \exp(\beta z)} \to \frac{1}{2} \text{around } z = 0$$

(where $\beta$ control the curvature).

The MDEQ models may apply convolutions with small receptive fields (e.g., the two 3×3 convolutional filters in $f_\theta$'s residual block) on potentially very large images (e.g., 2048×1024 images). For instance, the MDEQ may eventually evaluate semantic segmentation models on megapixel-level images. In practice, this may mean that typically the system may need a higher number of root-finding iterations to converge to an exact equilibrium. While this does pose a challenge, the MDEQ model may multiscale simultaneous up- and downsampling and utilize quasi-Newton root-finding to drive the model close to equilibrium within a reasonable number of root-finding iterations.

Figure 4:
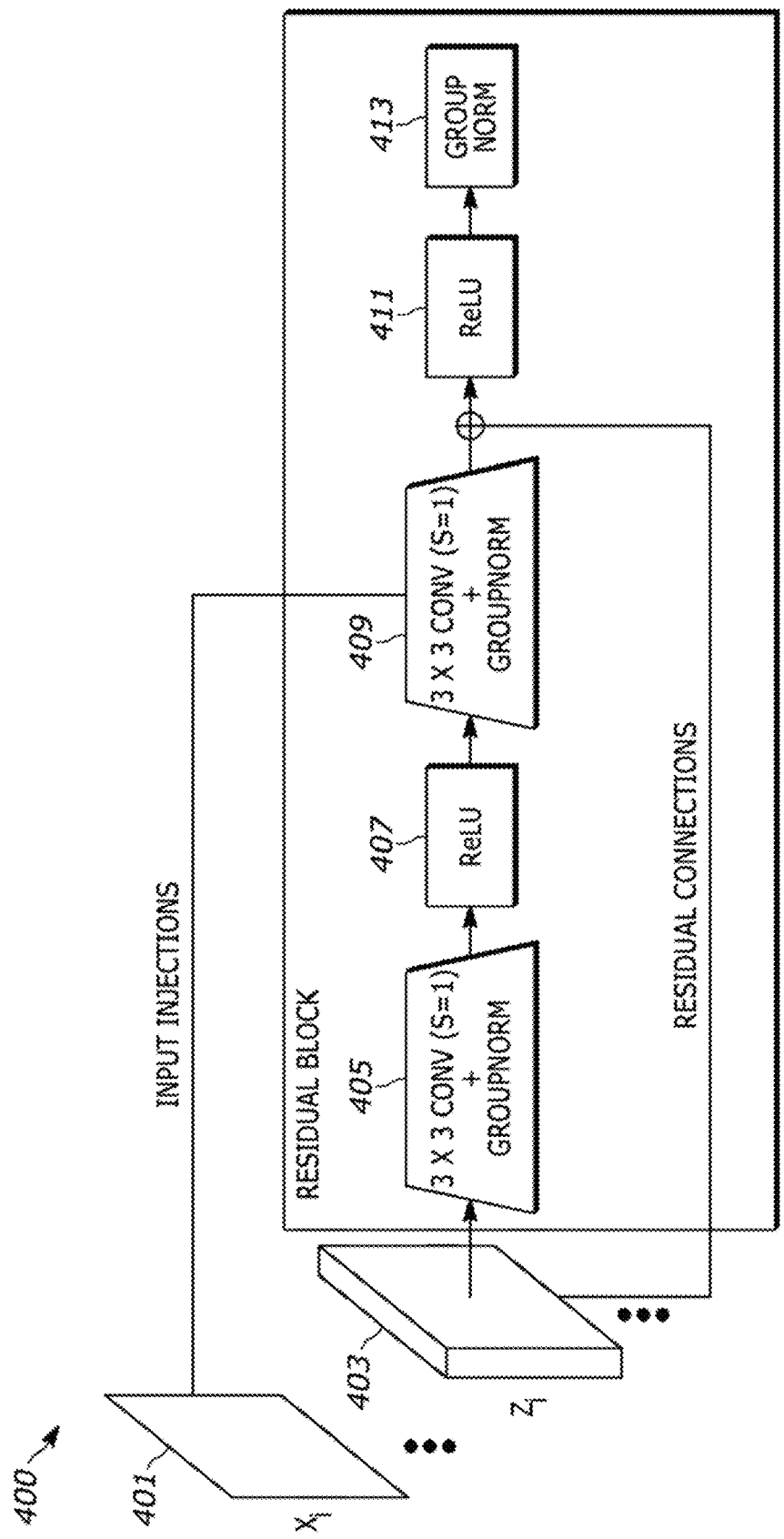
FIG. 4 depicts an internal structure of system 400 that includes a residual block.

FIG. 4 discloses an internal structure of system 400 that includes a residual block. The residual block may utilize group normalization 413 rather than a batch normalization. The residual block at resolution i can be formally expressed as the following below, with an output of $z_i^+$ for each resolution i=1, . . . , n:

$\tilde{z}_i = \text{Norm}(\text{Conv2d}(z_i))$ $\hat{z} = \text{Norm}(\text{Conv2d}(\text{ReLU}(\tilde{z}_i)) + x_i$ $z_i^+ = \text{Norm}(\text{ReLU}(\hat{z}_i + z_i))$ Thus, a two-dimensional (2D) Convolution layer 405 with group normalization may output a convolution kernel that is wind with layers to help produce a tensor of outputs. A rectifier 407 may be utilized on the convolution kernel output from block 405. The activation function may include a Rectified Linear Unit (ReLU) 407, 411. The second 2D Convolution layer 409 with group normalization may receive the internal state $z_i$ along with an input representation $x_i$, and outputs a transformed feature tensor $z_i^+$ at the same resolution, as specified in the formula above. The residual block may apply a 2-strided 3×3 convolution to higher resolutions, and a 1×1 convolution followed by bilinear interpolation to lower resolutions.

Following these blocks, the second part of $f_\theta$ is a multi-resolution fusion step that mixes the feature maps across different scales. The transformed features $z_i^+$ undergo either upsampling or down sampling from the current scale i to each other scale j not equal to i. In the MDEQ construction, down sampling may be performed by (one or more) 2-strided 3×3 Conv2d, whereas upsampling is performed by a 1×1 convolution followed by bilinear interpolation. The final output scale j may be formed by summing over the transformed features maps provided from all incoming scales i (along with $z_j^+$). Thus the output feature tensor at each scale is a mixture of transformed features from all scales. This may force the features at all scales to be consistent and drives the whole system to a coordinated equilibrium that harmonizes the representation across scales.

Figure 5:
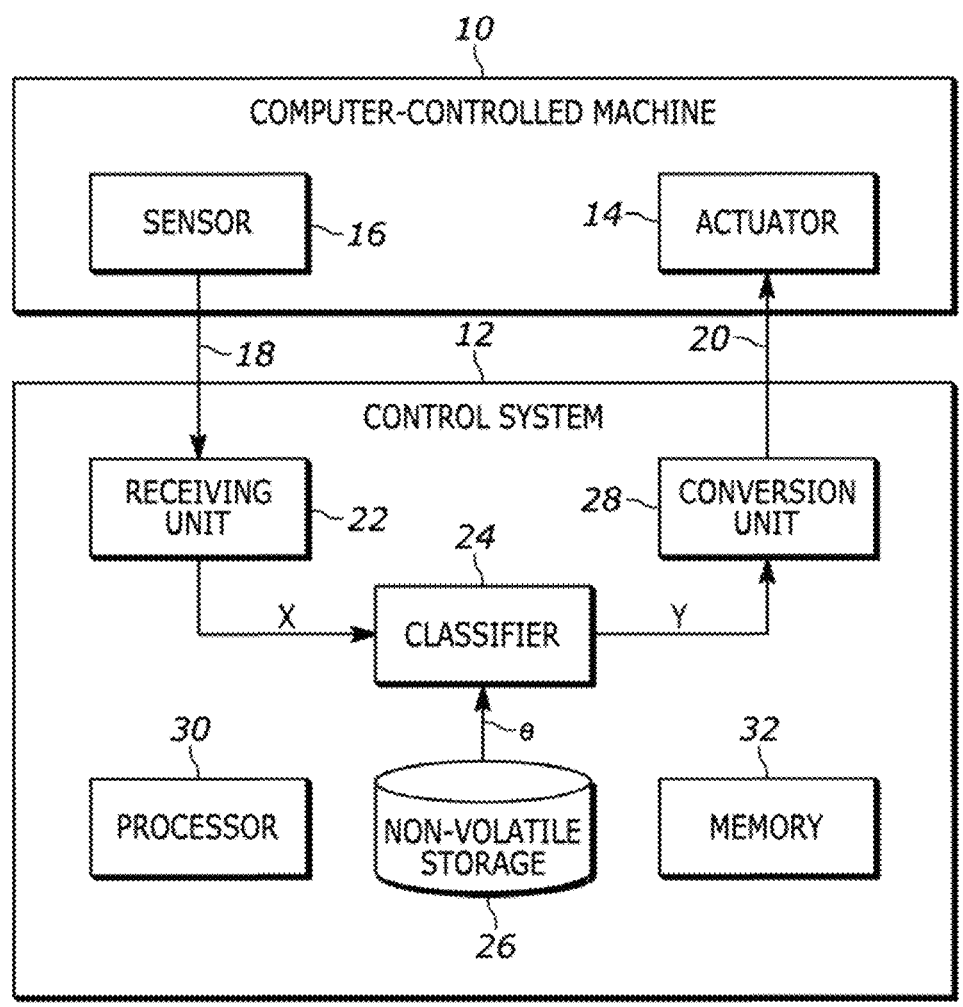
FIG. 5 depicts a schematic diagram of an interaction between computer-controlled machine 10 and control system 12.

FIG. 5 depicts a schematic diagram of an interaction between computer-controlled machine 10 and control system 12. The computer-controlled machine 10 may include a neural network as described in FIGS. 1-4. The computer-controlled machine 10 includes actuator 14 and sensor 16. Actuator 14 may include one or more actuators and sensor 16 may include one or more sensors. Sensor 16 is configured to sense a condition of computer-controlled machine 10. Sensor 16 may be configured to encode the sensed condition into sensor signals 18 and to transmit sensor signals 18 to control system 12. Non-limiting examples of sensor 16 include video, radar, LiDAR, ultrasonic and motion sensors. In one embodiment, sensor 16 is an optical sensor configured to sense optical images of an environment proximate to computer-controlled machine 10.

Control system 12 is configured to receive sensor signals 18 from computer-controlled machine 10. As set forth below, control system 12 may be further configured to compute actuator control commands 20 depending on the sensor signals and to transmit actuator control commands 20 to actuator 14 of computer-controlled machine 10.

As shown in FIG. 5, control system 12 includes receiving unit 22. Receiving unit 22 may be configured to receive sensor signals 18 from sensor 16 and to transform sensor signals 18 into input signals x. In an alternative embodiment, sensor signals 18 are received directly as input signals x without receiving unit 22. Each input signal x may be a portion of each sensor signal 18. Receiving unit 22 may be configured to process each sensor signal 18 to product each input signal x. Input signal x may include data corresponding to an image recorded by sensor 16.

Control system 12 includes classifier 24. Classifier 24 may be configured to classify input signals x into one or more labels using a machine learning (ML) algorithm, such as a neural network described above. Classifier 24 is configured to be parametrized by parameters, such as those described above (e.g., parameter θ). Parameters θ may be stored in and provided by non-volatile storage 26. Classifier 24 is configured to determine output signals y from input signals x. Each output signal y includes information that assigns one or more labels to each input signal x. Classifier 24 may transmit output signals y to conversion unit 28. Conversion unit 28 is configured to covert output signals y into actuator control commands 20. Control system 12 is configured to transmit actuator control commands 20 to actuator 14, which is configured to actuate computer-controlled machine 10 in response to actuator control commands 20. In another embodiment, actuator 14 is configured to actuate computer-controlled machine 10 based directly on output signals y.

Upon receipt of actuator control commands 20 by actuator 14, actuator 14 is configured to execute an action corresponding to the related actuator control command 20. Actuator 14 may include a control logic configured to transform actuator control commands 20 into a second actuator control command, which is utilized to control actuator 14. In one or more embodiments, actuator control commands 20 may be utilized to control a display instead of or in addition to an actuator.

In another embodiment, control system 12 includes sensor 16 instead of or in addition to computer-controlled machine 10 including sensor 16. Control system 12 may also include actuator 14 instead of or in addition to computer-controlled machine 10 including actuator 14.

As shown in FIG. 5, control system 12 also includes processor 30 and memory 32. Processor 30 may include one or more processors. Memory 32 may include one or more memory devices. The classifier 24 (e.g., ML algorithms) of one or more embodiments may be implemented by control system 12, which includes non-volatile storage 26, processor 30 and memory 32.

Non-volatile storage 26 may include one or more persistent data storage devices such as a hard drive, optical drive, tape drive, non-volatile solid-state device, cloud storage or any other device capable of persistently storing information. Processor 30 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 32. Memory 32 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 30 may be configured to read into memory 32 and execute computer-executable instructions residing in non-volatile storage 26 and embodying one or more ML algorithms and/or methodologies of one or more embodiments. Non-volatile storage 26 may include one or more operating systems and applications. Non-volatile storage 26 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 30, the computer-executable instructions of non-volatile storage 26 may cause control system 12 to implement one or more of the ML algorithms and/or methodologies as disclosed herein. Non-volatile storage 26 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
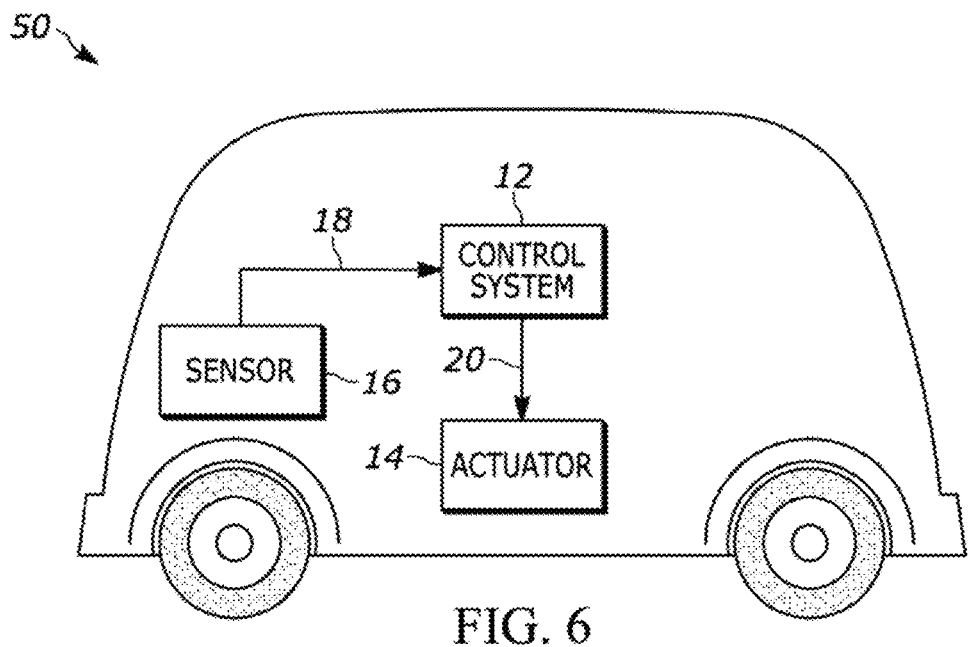
FIG. 6 depicts a schematic diagram of the control system of FIG. 1 configured to control a vehicle, which may be a partially autonomous vehicle or a partially autonomous robot.

FIG. 6 depicts a schematic diagram of control system 12 configured to control vehicle 50, which may be an at least partially autonomous vehicle or an at least partially autonomous robot. As shown in FIG. 5, vehicle 50 includes actuator 14 and sensor 16. Sensor 16 may include one or more video sensors, radar sensors, ultrasonic sensors, LiDAR sensors, and/or position sensors (e.g. GPS). One or more of the one or more specific sensors may be integrated into vehicle 50. Alternatively or in addition to one or more specific sensors identified above, sensor 16 may include a software module configured to, upon execution, determine a state of actuator 14. One non-limiting example of a software module includes a weather information software module configured to determine a present or future state of the weather proximate vehicle 50 or other location.

Classifier 24 of control system 12 of vehicle 50 may be configured to detect objects in the vicinity of vehicle 50 dependent on input signals x. In such an embodiment, output signal y may include information characterizing the vicinity of objects to vehicle 50. Actuator control command 20 may be determined in accordance with this information. The actuator control command 20 may be used to avoid collisions with the detected objects.

In embodiments where vehicle 50 is an at least partially autonomous vehicle, actuator 14 may be embodied in a brake, a propulsion system, an engine, a drivetrain, or a steering of vehicle 50. Actuator control commands 20 may be determined such that actuator 14 is controlled such that vehicle 50 avoids collisions with detected objects. Detected objects may also be classified according to what classifier 24 deems them most likely to be, such as pedestrians or trees. The actuator control commands 20 may be determined depending on the classification.

In other embodiments where vehicle 50 is an at least partially autonomous robot, vehicle 50 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 20 may be determined such that a propulsion unit, steering unit and/or brake unit of the mobile robot may be controlled such that the mobile robot may avoid collisions with identified objects.

In another embodiment, vehicle 50 is an at least partially autonomous robot in the form of a gardening robot. In such embodiment, vehicle 50 may use an optical sensor as sensor 16 to determine a state of plants in an environment proximate vehicle 50. Actuator 14 may be a nozzle configured to spray chemicals. Depending on an identified species and/or an identified state of the plants, actuator control command 20 may be determined to cause actuator 14 to spray the plants with a suitable quantity of suitable chemicals.

Vehicle 50 may be an at least partially autonomous robot in the form of a domestic appliance. Non-limiting examples of domestic appliances include a washing machine, a stove, an oven, a microwave, or a dishwasher. In such a vehicle 50, sensor 16 may be an optical sensor configured to detect a state of an object which is to undergo processing by the household appliance. For example, in the case of the domestic appliance being a washing machine, sensor 16 may detect a state of the laundry inside the washing machine. Actuator control command 20 may be determined based on the detected state of the laundry.

Figure 7:
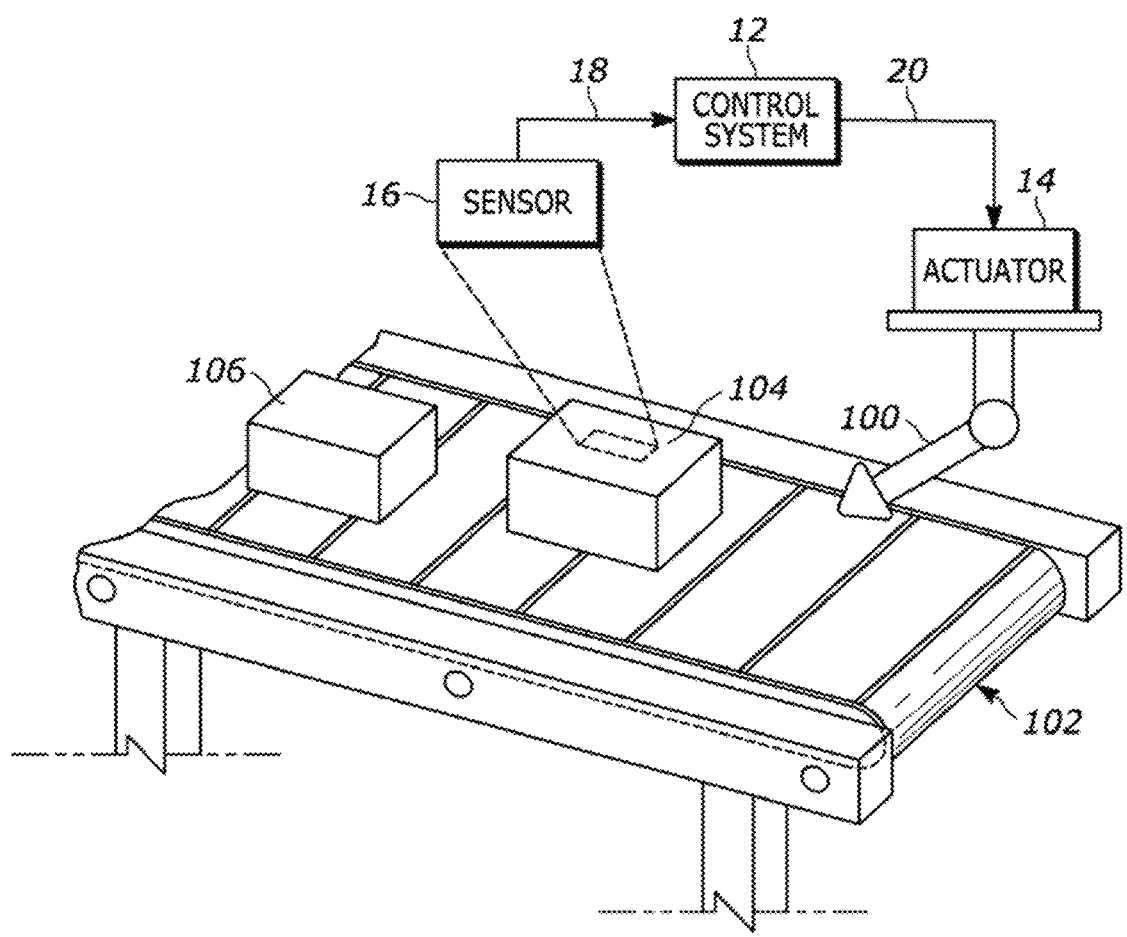
FIG. 7 depicts a schematic diagram of the control system of FIG. 1 configured to control a manufacturing machine, such as a punch cutter, a cutter or a gun drill, of manufacturing system, such as part of a production line.

FIG. 7 depicts a schematic diagram of control system 12 configured to control system 100 (e.g., manufacturing machine), such as a punch cutter, a cutter or a gun drill, of manufacturing system 102, such as part of a production line. Control system 12 may be configured to control actuator 14, which is configured to control system 100 (e.g., manufacturing machine).

Sensor 16 of system 100 (e.g., manufacturing machine) may be an optical sensor configured to capture one or more properties of manufactured product 104. Classifier 24 may be configured to determine a state of manufactured product 104 from one or more of the captured properties. Actuator 14 may be configured to control system 100 (e.g., manufacturing machine) depending on the determined state of manufactured product 104 for a subsequent manufacturing step of manufactured product 104. The actuator 14 may be configured to control functions of system 100 (e.g., manufacturing machine) on subsequent manufactured product 106 of system 100 (e.g., manufacturing machine) depending on the determined state of manufactured product 104.

Figure 8:
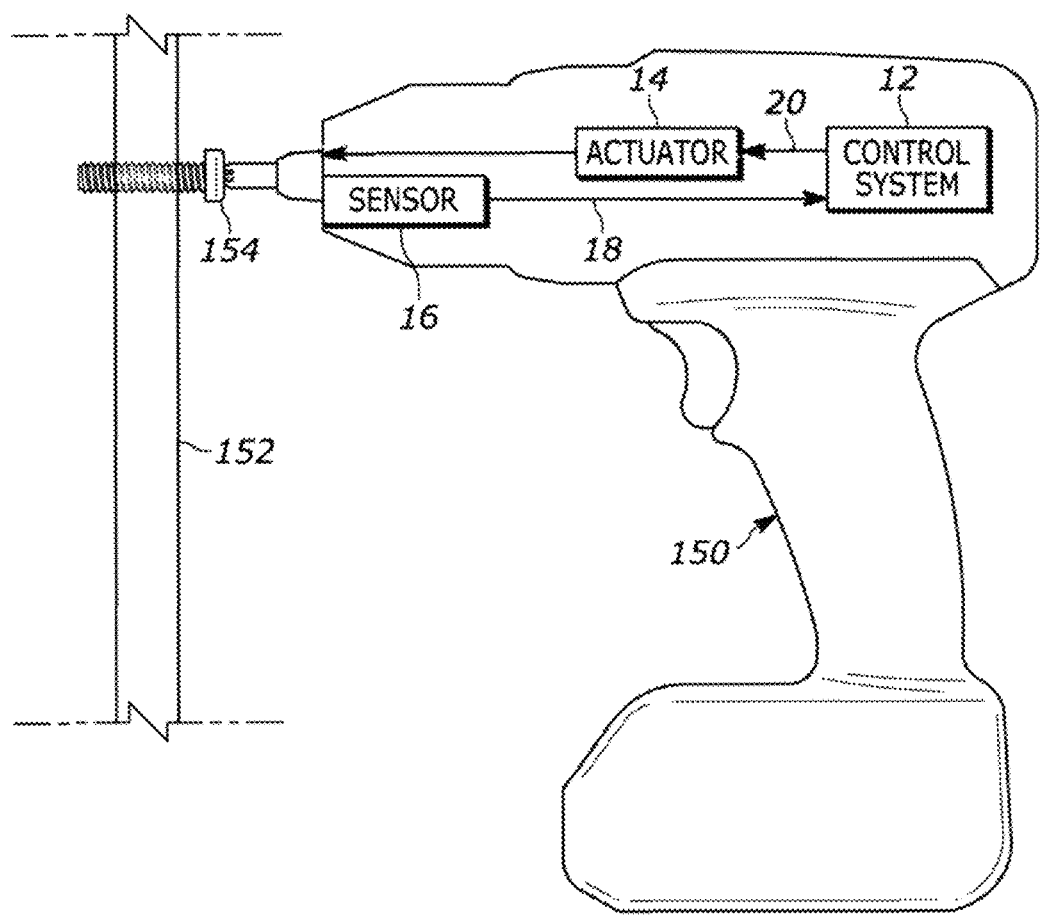
FIG. 8 depicts a schematic diagram of the control system of FIG. 1 configured to control a power tool, such as a power drill or driver, that has an at least partially autonomous mode.

FIG. 8 depicts a schematic diagram of control system 12 configured to control power tool 150, such as a power drill or driver, that has an at least partially autonomous mode. Control system 12 may be configured to control actuator 14, which is configured to control power tool 150.

Sensor 16 of power tool 150 may be an optical sensor configured to capture one or more properties of work surface 152 and/or fastener 154 being driven into work surface 152. Classifier 24 may be configured to determine a state of work surface 152 and/or fastener 154 relative to work surface 152 from one or more of the captured properties. The state may be fastener 154 being flush with work surface 152. The state may alternatively be hardness of work surface 152. Actuator 14 may be configured to control power tool 150 such that the driving function of power tool 150 is adjusted depending on the determined state of fastener 154 relative to work surface 152 or one or more captured properties of work surface 152. For example, actuator 14 may discontinue the driving function if the state of fastener 154 is flush relative to work surface 152. As another non-limiting example, actuator 14 may apply additional or less torque depending on the hardness of work surface 152.

Figure 9:
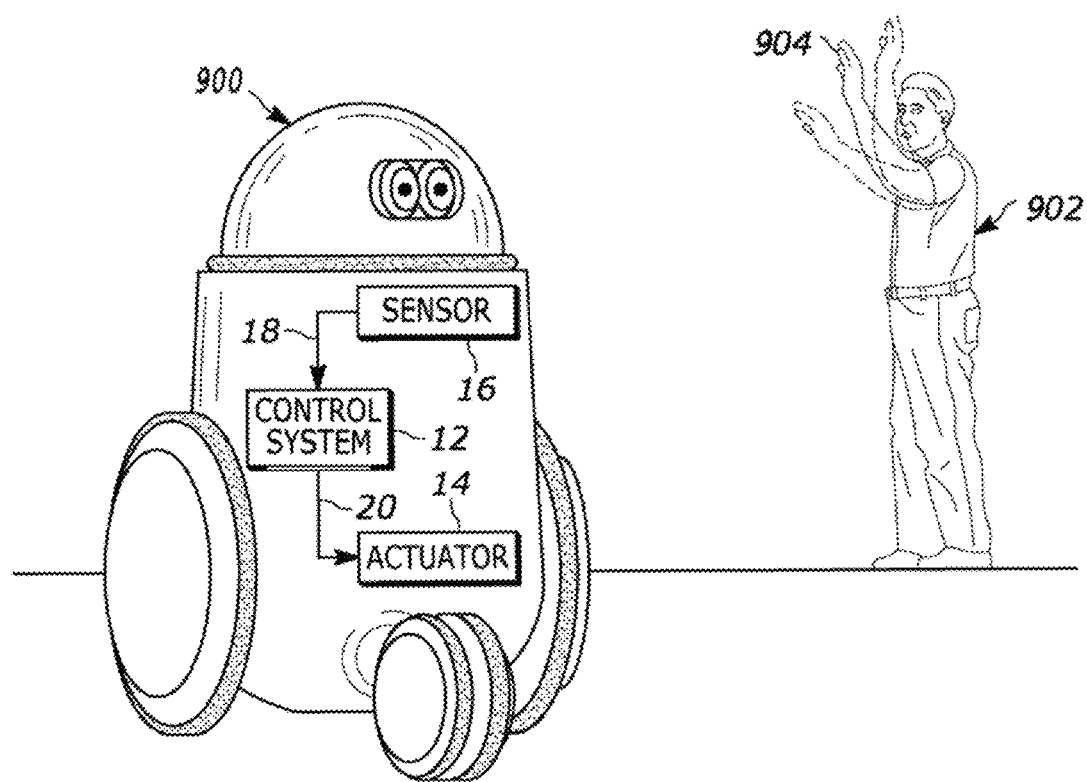
FIG. 9 depicts a schematic diagram of the control system of FIG. 1 configured to control an automated personal assistant.

FIG. 9 depicts a schematic diagram of control system 12 configured to control automated personal assistant 900. Control system 12 may be configured to control actuator 14, which is configured to control automated personal assistant 900. Automated personal assistant 900 may be configured to control a domestic appliance, such as a washing machine, a stove, an oven, a microwave or a dishwasher.

Sensor 16 may be an optical sensor and/or an audio sensor. The optical sensor may be configured to receive video images of gestures 904 of user 902. The audio sensor may be configured to receive a voice command of user 902.

Control system 12 of automated personal assistant 900 may be configured to determine actuator control commands 20 configured to control system 12. Control system 12 may be configured to determine actuator control commands 20 in accordance with sensor signals 18 of sensor 16. Automated personal assistant 900 is configured to transmit sensor signals 18 to control system 12. Classifier 24 of control system 12 may be configured to execute a gesture recognition algorithm to identify gesture 904 made by user 902, to determine actuator control commands 20, and to transmit the actuator control commands 20 to actuator 14. Classifier 24 may be configured to retrieve information from non-volatile storage in response to gesture 904 and to output the retrieved information in a form suitable for reception by user 902.

Figure 10:
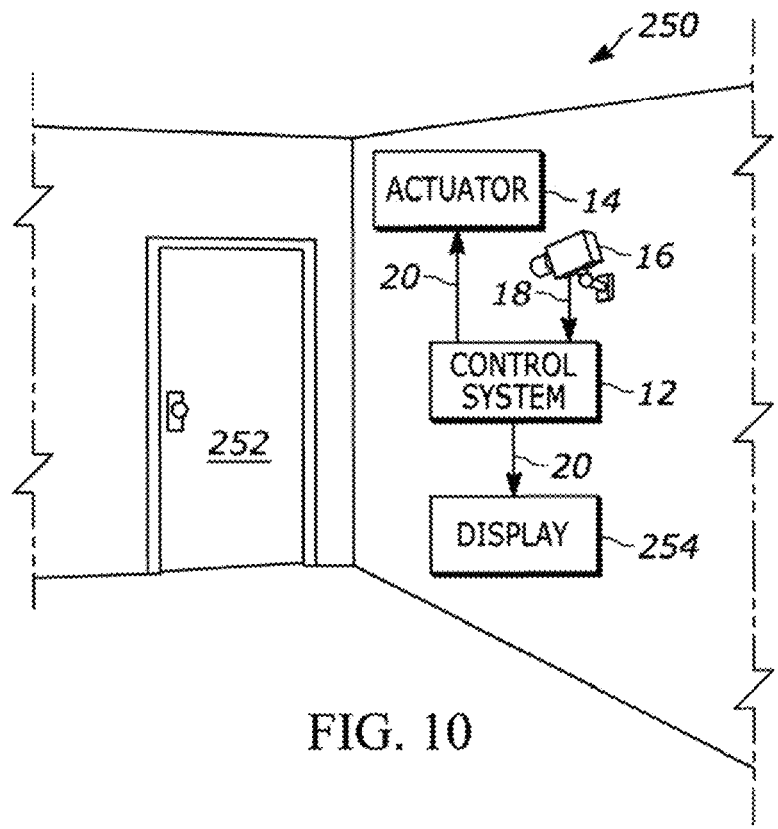
FIG. 10 depicts a schematic diagram of the control system of FIG. 1 configured to control a monitoring system, such as a control access system or a surveillance system.

FIG. 10 depicts a schematic diagram of control system 12 configured to control monitoring system 250. Monitoring system 250 may be configured to physically control access through door 252. Sensor 16 may be configured to detect a scene that is relevant in deciding whether access is granted. Sensor 16 may be an optical sensor configured to generate and transmit image and/or video data. Such data may be used by control system 12 to detect a person's face.

Classifier 24 of control system 12 of monitoring system 250 may be configured to interpret the image and/or video data by matching identities of known people stored in non-volatile storage 26, thereby determining an identity of a person. Classifier 24 may be configured to generate and an actuator control command 20 in response to the interpretation of the image and/or video data. Control system 12 is configured to transmit the actuator control command 20 to actuator 14. In this embodiment, actuator 14 may be configured to lock or unlock door 252 in response to the actuator control command 20. In other embodiments, a non-physical, logical access control is also possible.

Monitoring system 250 may also be a surveillance system. In such an embodiment, sensor 16 may be an optical sensor configured to detect a scene that is under surveillance and control system 12 is configured to control display 254. Classifier 24 is configured to determine a classification of a scene, e.g. whether the scene detected by sensor 16 is suspicious. Control system 12 is configured to transmit an actuator control command 20 to display 254 in response to the classification. Display 254 may be configured to adjust the displayed content in response to the actuator control command 20. For instance, display 254 may highlight an object that is deemed suspicious by classifier 24.

Figure 11:
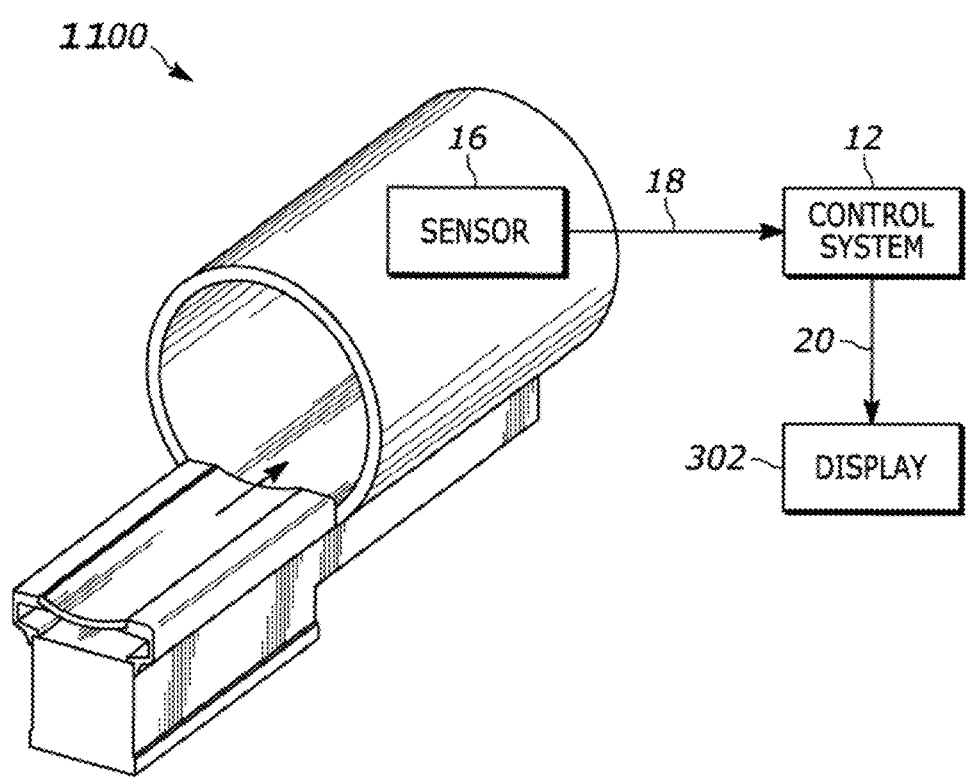
FIG. 11 depicts a schematic diagram of the control system of FIG. 1 configured to control an imaging system, for example an MRI apparatus, x-ray imaging apparatus or ultrasonic apparatus.

FIG. 11 depicts a schematic diagram of control system 12 configured to control imaging system 1100, for example an MRI apparatus, x-ray imaging apparatus or ultrasonic apparatus. Sensor 16 may, for example, be an imaging sensor. Classifier 24 may be configured to determine a classification of all or part of the sensed image. Classifier 24 may be configured to determine or select an actuator control command 20 in response to the classification obtained by the trained neural network. For example, classifier 24 may interpret a region of a sensed image to be potentially anomalous. In this case, actuator control command 20 may be determined or selected to cause display 302 to display the imaging and highlighting the potentially anomalous region.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for a classification and training a neural network, comprising:
receiving input at the neural network, wherein the input includes a plurality of resolution inputs of varying resolutions;
outputting a plurality of feature tensors for each corresponding resolution of the plurality of resolution inputs;
fusing the plurality of feature tensors utilizing upsampling or down sampling of the corresponding resolutions;
utilizing an equilibrium solver to identify one or more prediction vectors from the plurality of feature tensors; and
outputting a loss in response to the one or more prediction vectors.

2. The computer-implemented method of claim 1, wherein outputting the loss is in response to a backwards propagation sequence utilizing only a single layer.

3. The computer-implemented method of claim 1, wherein the plurality of resolution inputs each input to a corresponding residual block for that specific resolution.

4. The computer-implemented method of claim 1, wherein input includes a plurality of resolution inputs containing different sized pixel images.

5. The computer-implemented method of claim 1, wherein the method includes utilizing a plurality of residual blocks for outputting a feature tensor for each corresponding resolution of the plurality of resolution inputs.

6. The computer-implemented method of claim 1, wherein one of the feature tensors corresponding to a highest resolution of the plurality of resolution inputs is only down sampled.

7. The computer-implemented method of claim 1, wherein one of the feature tensors corresponding to a lowest resolution of the plurality of resolution inputs is only up sampled.

8. The computer-implemented method of claim 1, wherein the fusing of the plurality of feature tensors is conducted in a single layer.

9. The computer-implemented method of claim 1, wherein the down sampling is performed by a 2-strided 3 by 3 two-dimensional convolution layer.

10. The computer-implemented method of claim 1, wherein the upsampling is performed by a 1 by 1 convolution followed by bilinear interpolation.

11. A computer-implemented method for a classification of input to a neural network, comprising:
receiving input at the neural network, wherein the input includes a plurality of resolution inputs;
identifying feature tensors for each corresponding resolution of the plurality of resolution inputs;
inputting the feature tensors for each corresponding resolution to a corresponding residual block; and
utilizing an equilibrium solver to identify one or more prediction vectors from the feature tensors to output a classification of the input.

12. The computer-implemented method of claim 11, wherein the method includes fusing the feature tensors for each corresponding residual block by down sampling or up sampling.

13. The computer-implemented method of claim 11, wherein the input is an image and the plurality of resolution inputs are varying resolutions of the image.

14. The computer-implemented method of claim 11, wherein the neural network only includes a single layer.

15. The computer-implemented method of claim 11, wherein the method includes applying group normalization to group the plurality of resolution inputs and perform normalization within each corresponding resolution.

16. The computer-implemented method of claim 11, wherein the method includes outputting a loss in response to the one or more prediction vectors training the neural network utilizing a backward propagation, wherein the backward propagation includes identifying a derivative of a loss associated with hyperparameters of the neural network.

17. The computer-implemented method of claim 11, wherein the method includes fusing the feature tensors utilizing upsampling or down sampling for each corresponding resolution.

18. A system including a neural network, comprising:
an input interface for accessing input data for the neural network; and
a processor in communication with the input interface, the processor programmed to:
receive the input data at the neural network, wherein the input includes a plurality of resolution inputs of varying resolutions;
output a plurality of feature tensors for each corresponding resolution of the plurality of resolution inputs;
fuse the plurality of feature tensors utilizing upsampling or down sampling;
utilize an equilibrium solver to identify a prediction vector in response to the plurality of feature tensors, wherein the prediction vector includes features associated with each of the plurality of feature tensors; and
output the prediction vector as a classification of the input data.

19. The system of claim 18, wherein the input data includes an image and the plurality of resolution inputs includes varying resolutions of the image.

20. The system of claim 18, wherein each of the plurality of feature tensors for each corresponding resolution is sent to a corresponding residual block.

* * * * *